US012168280B2

(12) United States Patent
Benson et al.

(10) Patent No.: US 12,168,280 B2
(45) Date of Patent: Dec. 17, 2024

(54) SYSTEM AND METHOD FOR CONDITIONING ABRASIVE MEDIA

(71) Applicant: SI Group, LLC, New Franken, WI (US)

(72) Inventors: Ronald Benson, Reno, NV (US); Matthew Michel, Shoreview, MN (US)

(73) Assignee: Intense Grit Systems, LLC, New Franken, WI (US)

(*) Notice: Subject to any disclaimer, the term of this patent is extended or adjusted under 35 U.S.C. 154(b) by 0 days.

(21) Appl. No.: 18/156,968

(22) Filed: Jan. 19, 2023

(65) Prior Publication Data

US 2024/0246196 A1 Jul. 25, 2024

(51) Int. Cl.

| | |
|---|---|
| ***B07B 1/22*** | (2006.01) |
| ***B07B 1/00*** | (2006.01) |
| ***B24B 57/00*** | (2006.01) |
| ***F26B 3/30*** | (2006.01) |
| ***F26B 17/02*** | (2006.01) |

(52) U.S. Cl.

CPC .............. *B24B 57/00* (2013.01); *B07B 1/005* (2013.01); *B07B 1/22* (2013.01); *F26B 3/30* (2013.01); *F26B 17/02* (2013.01); *B07B 2230/04* (2013.01)

(58) Field of Classification Search

CPC ....... B07B 1/005; B07B 1/22; B07B 2230/04; F26B 3/30; F26B 17/02; F26B 17/045; F26B 17/14; F26B 17/1475

USPC .......................................................... 209/288

See application file for complete search history.

(56) References Cited

U.S. PATENT DOCUMENTS

| | | | | |
|---|---|---|---|---|
| 5,189,809 | A * | 3/1993 | Bailey | F26B 17/02 34/267 |
| 5,468,174 | A | 11/1995 | Bachand et al. | |
| 9,022,835 | B1 | 5/2015 | Gus | |
| 11,187,459 | B2 * | 11/2021 | Benson | B22F 1/052 |
| 2010/0323588 | A1 | 12/2010 | Benson | |
| 2013/0174438 | A1 | 7/2013 | Moarn et al. | |
| 2016/0354806 | A1 * | 12/2016 | Eberts | B07B 1/22 |

(Continued)

FOREIGN PATENT DOCUMENTS

CN 213386278 U 6/2021

OTHER PUBLICATIONS

International Search Report and Written Opinion for PCT/US2024/012289 dated Mar. 29, 2024, 18 pages.

*Primary Examiner* — Michael McCullough
*Assistant Examiner* — Jessica L Burkman
(74) *Attorney, Agent, or Firm* — Foley & Lardner LLP

(57) ABSTRACT

A conditioner for filtering and drying recyclable abrasive media, such as steel grit, garnet, or other abrasive media used for abrasive blasting operations for steel structures, such as bridges, tanks, and marine vessels that are being repainted. The conditioner may include a pre-classifier (e.g., a trommel) to separate or filter the abrasive media from larger debris that may be vacuumed with the abrasive media during resurfacing operations. A dryer may use radiation elements (e.g., infrared (IR) lamps) positioned above a conveyor (e.g., vibration tray) that moves the abrasive media beneath the radiation elements. Vacuum airflow may bypass the dryer except for a portion of the vacuum airflow used to remove moisture from the dryer while drying the abrasive media. The conditioner may have a drying portion or the entirety under negative pressures.

20 Claims, 10 Drawing Sheets

(56) References Cited

U.S. PATENT DOCUMENTS

2017/0297060 A1* 10/2017 Maas ........................ B07B 1/46
2020/0224971 A1 7/2020 Benson

* cited by examiner

SYSTEM AND METHOD FOR CONDITIONING ABRASIVE MEDIA

BACKGROUND OF THE INVENTION

The process of using grit, especially steel grit, as a blast media for cleaning steel goes back to the early 1900's, but it was not until the mid-1980's that steel grit began to be used in mobile applications. Some of the first places steel grit was used was for blast cleaning of steel tanks of all types and sizes, including nuclear torus vessels, water, and fuel tanks. When used inside a tank, moisture was typically not a problem, as the tank itself provided protection from rain and other precipitation.

The use of steel grit was so effective that contractors began using the steel grit to blast the exteriors of tanks and then bridges. However, the exposure to the environment made contamination from sudden rainstorms and other water sources, including high humidity, a problem. Steel grit by its nature requires absolutely dry conditions (e.g., less than about 0.1%, less than about 0.05%, less than 0.001%, or lower), including the use of compressed air dried to a −10 degree dew point for abrasive blasting operations as condensate tends to cause corrosion of the steel grit particles.

When moisture comes in contact with steel grit particles, the moisture causes the particles, which are generally the size of a grain of sand, to stick together until exposure to air begins the process of corrosion, which leads to rusting or corrosion of the steel grit. When rusting occurs, the small steel grit particles are bonded together by the corrosion process as the grit dries and rust forms. The corrosion process causes clumping in the steel grit as the steel grit particles literally rust themselves together, forming irregularly shaped "rocks" of thousands of corroded particles. These rocks and corroded steel grit result in a damaged steel grit that has to be thrown away or significantly reduces the effectiveness of the steel grit in blasting structures. Moreover, wet steel grit significantly negatively impacts steel grit recycling operations, including clogging up a pathway through which the steel grit flows within the recycler. When clogging occurs, operators who are performing vacuuming operations tend to rapidly open and close a vacuum valve to unclog the pathway, but such opening and closing wears on the vacuum valve and potentially further negatively impacts operations of the recycler. Additionally, operators become frustrated by the inefficiency of the recycling process. For at least these reasons, operators typically avoid using steel grit in precipitation (e.g., rain or high humidity conditions), which is costly and inefficient.

The Economics of Using Steel Grit

In the process of blasting of bridges, tanks, ships and other steel objects with abrasive blast media or abrasive media, steel grit is becoming a popular abrasive media for a number of reasons. The primary reason is economics. The steel grit particles can be recycled 100 to 200 or more times with non-metallic particles being removed on each pass through the recycling machine. Other abrasive media, such as garnet, may also be recycled, but with a much more limited number of recycles, such as up to 5 or 6 times because the garnet tends to break down through each pass. In addition to the recycling benefit, the density of steel grit is roughly 2.5 times greater than sand or coal slag, so the impact of the steel grit on a steel member or other structural surface is greater, meaning that more work is accomplished each time a steel grit particle hits the surface.

Abrasive blasting systems are used in preparing surfaces for painting. Some abrasive blasting systems are configured to recycle blast media after blasting the steel grit. Abrasive or blast media capable of being recycled includes garnet, specular hematite, steel grit, steel shot, and other media. The blast media is often cleaned at a certain stage in the recycling process to remove dust from the media, as the blast media is generally ineffective below a certain size (e.g., 15 mesh for steel grit), as understood in the art. Cleaning the blast media typically includes passing air across the blast media, so that as the blast media is collected in a hopper, the dust is already removed from the blast media, thereby making the blast media ready for use in blasting against a surface.

The steel grit abrasive blasting process is especially popular where hazardous paint coatings are to be removed, which creates a quantity of waste that is then disposed of as hazardous waste by law. By using steel grit, which gets recycled each time with all non-metallic hazardous material being removed through the recycling machine, the volume of waste can be reduced to roughly 1% of what would be created if non-recyclable medias like sand or coal slag are used. The recycling dramatically reduces the volume of waste that needs to be disposed of, thereby significantly reducing the cost of proper hazardous waste disposal. These economic benefits are what justifies the cost of steel grit recycling machines despite the drawbacks from precipitation, as previously described.

One significant problem with recyclable abrasive media occurs on high humidity days, where high humidity is typically considered to be about 60% humidity or higher, as dust that attaches itself to the abrasive media tends not to be easily removed from the abrasive media even after being processed by the blast recycling machine. When the abrasive media is stored back into a storage hopper for further blasting, the dust that is attached to the abrasive media is blasted onto the steel surface being treated, which results in a higher amount of dust than if the abrasive media were dust-free. When the blasting operation is being performed within a containment, the dust content in the air of the containment makes the air unhealthy to breathe and also perform work due to reduced visibility while blasting. Moreover, if paint on the steel structure is a lead-based paint, then the dust particles necessarily include lead dust particles, which makes the air hazardous, if not deadly, to breathe. There are certain regulations that mandate levels of dust and/or lead dust within a containment require cessation of work operations. Hence, high humidity days can often lead to a cessation of blasting operations due to higher levels of dust and/or lead dust particles within a containment, as described above.

Because the cost of steel grit per ton is many times that of sand or slag, the steel grit may be recycled again and again to gain the economic benefits for the user, while at the same time reducing the volume of waste taken to disposal sites. Thus, when the grit falls to the containment surface or ground, the grit should be quickly recovered, usually using a vacuum device that pulls the grit back to the recycling machine.

Vacuuming or Gravity Recovery of Steel Grit

It is common today to use powerful vacuums driven by large diesel engines to recover the steel grit, whether the steel grit is collected on the ground, on a containment surface, or into some sort of collection hopper. In the recovery process, the steel grit can become mixed with flowing water from rain, which turns the mixture into damp or wet steel grit, thereby making it even heavier than the normal density of 265 lbs. per cubic foot. The added moisture additionally causes the steel grit to become sticky, where the granular steel grit no longer flows as it would at an angle of repose of between approximately 30 and 40 degrees.

Because the steel grit is so valuable, costing up to $1,000/ton or more, the operator recovers the grit back to the recycling machine even though it is known that the free moisture will cause clogging and eventual clumping as the grit rusts. While vacuuming the steel grit for recycling, large water droplets are typically removed from the steel grit. However, enough moisture content on the grit itself remains to cause the rusting and clumping processes. In the process of vacuuming, any opening or wear of the vacuum hose can also allow water to enter the system, thereby causing further moisture problems.

If the wet grit, such as steel or garnet, is allowed to sit for a prolonged period of time (e.g., a few days), the grit can become fully agglomerated (e.g., clumped into a clump of bound grit) that it typically has to be de-agglomerated using a jack hammer or other impact device. When sitting in a hopper, the water naturally drains to the bottom and can be drained off if a stainless steel filter screen mounted at the bottom allows for drainage. However, moisture content residing on the surface of the individual grains of steel grit that form a pile or in contact with other grains of steel grit that is not removed during the vacuuming process typically remains long enough to cause the rusting and clumping processes to occur.

SUMMARY OF THE INVENTION

To help reduce or avoid rusting and clumping processes of abrasive media, such as steel grit, to occur and to help lower dust levels within a containment on high humidity days, a drying process of the abrasive media may be performed. In one embodiment, a pre-conditioning or conditioning process may be performed by an abrasive media conditioner prior to recycling the abrasive media through a blasting recycling system. The conditioning process may include (i) a pre-classification process to remove debris, such as rocks and other large debris, from the abrasive media at the blasting site and (ii) a drying process to dry the pre-classified abrasive media. As described herein, the conditioning process may be performed separately from an abrasive media recycling process performed by a recycling machine in that the conditioner may be a separate machine from the recycling machine, but use a vacuum from the recycling machine in transporting the abrasive media to the conditioner and then from the conditioner to the recycler machine. Both the conditioner and recycler machine may be mobile by being on trailers. Alternatively, one or both of the machines may be stationary (e.g., not positioned on a trailer with wheels, but rather being positioned on a skid or other base member). In an alternative configuration, the conditioner may be integrated onto a recycler machine. Still yet, the conditioner may include an onboard vacuum for situations in which an off-board vacuum is not available or if negative pressures are to be applied to the conditioner for more efficient drying operations of the abrasive media.

One embodiment of a conditioner for processing abrasive media may include an inlet port through which the abrasive media and debris intermixed with the abrasive media is received by the conditioner. A pre-classifier may be in fluid communication with the inlet port and configured to filter the abrasive media from the debris, where being in fluid communication includes airflow between the inlet port and the pre-classifier. A conveyor may be in fluid communication with the pre-classifier and configured to move the pre-classified abrasive media from a first end to a second end of the conveyor. A conveyor housing may surround the conveyor, and at least one radiation source may be disposed within the conveyor housing and be positioned above the conveyor so as to dry the pre-classified abrasive media while the conveyor is moving the pre-classified abrasive media. The radiation source(s), conveyor, and conveyor housing may define a dryer. An outlet port may be in fluid communication with the conveyor and configured to output the dry abrasive from the conditioner.

One embodiment of a method for processing abrasive media may include receiving abrasive media and debris intermixed with the abrasive media. The abrasive media may be filtered from the debris. The filtered abrasive media may be received at a conveyor. The filtered abrasive media may be moved by the conveyor from a first end to a second end of the conveyor. The filtered abrasive media may be dried by using at least one radiation source positioned above the conveyor while the conveyor is moving the filtered abrasive media. The dry abrasive media may be output.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
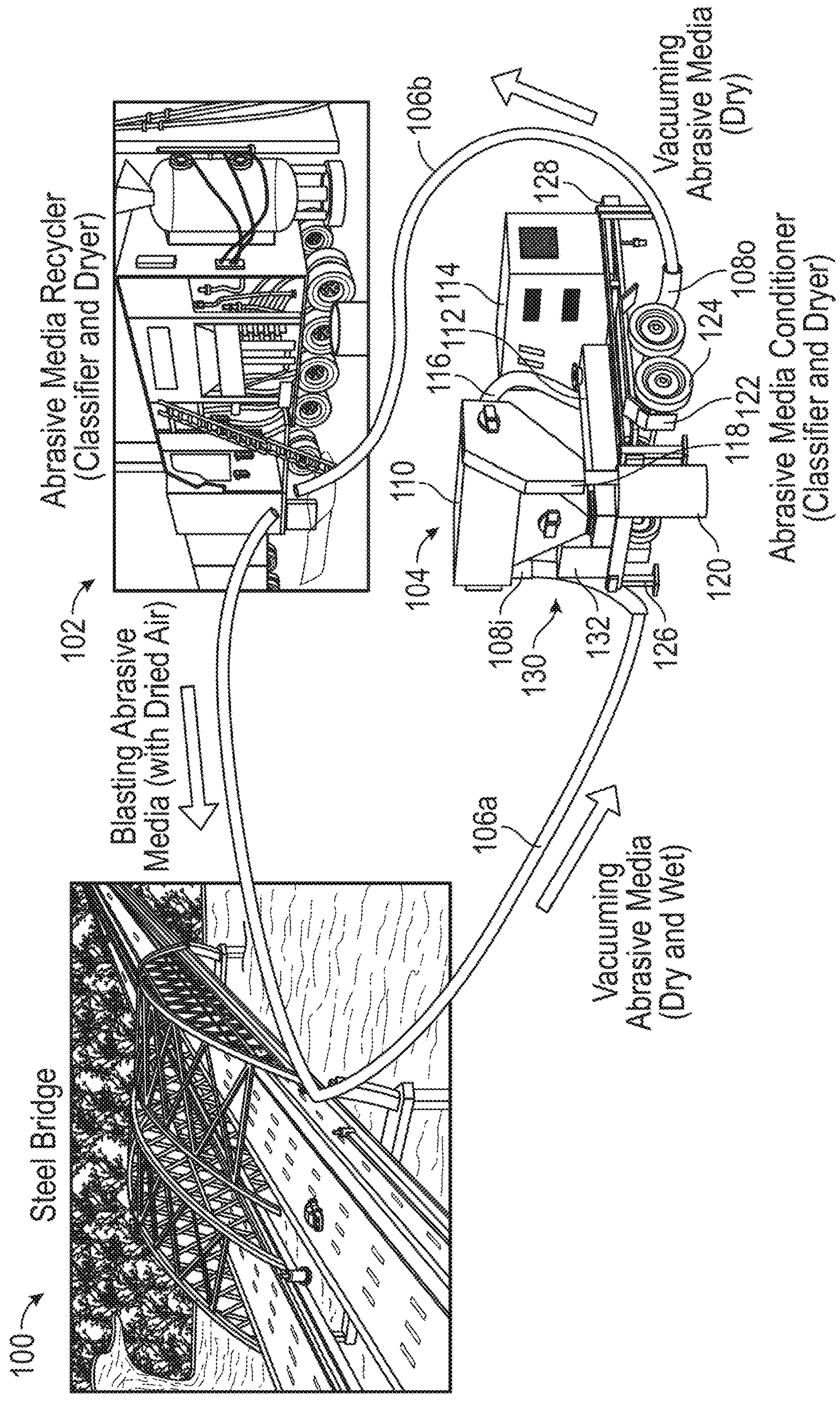
FIG. 1 is an illustration of an illustrative bridge on which abrasive media is used to blast steel surfaces of the bridge in preparation for painting along with an abrasive recycler and abrasive media conditioner that processes used abrasive media prior recycling by the abrasive media recycler.

With regard to FIG. 1, an illustration of an illustrative bridge 100 on which abrasive media is used to blast steel surfaces of the bridge in preparation for painting along with an abrasive media recycler 102 and abrasive media conditioner 104 that processes used abrasive media prior recycling by the abrasive media recycler is shown. The abrasive media recycler 120 may be configured to store the abrasive media in one or more storage hopper and blast the abrasive media from the storage hopper onto steel surfaces of the bridge 100 to remove paint therefrom. It should be understood that the abrasive media recycler 102 may be positioned on or near the bridge 102 while resurfacing operations are being performed. As understood in the art, hoses with nozzles connected to the abrasive media recycler 102 are used by operators to control blasting of the abrasive media. The abrasive media may include steel grit, garnet grit, copper slag, nickel slag, or any other type of recyclable abrasive blast media. However, because the recycler 102 may be configured to recycle the abrasive media, the recycler 102 may include a magnetic drum or other separation device that enables separation of the abrasive media and debris.

As shown, the abrasive media conditioner 104, which is configured to perform classification and drying of the abrasive media, may be positioned between the bridge 100 and recycler 102 by being in-line with vacuum hoses 106*a* and 106*b* (collectively vacuum hose 106). In being in-line with the vacuum hose 106, abrasive media conditioner 104 may connect with the vacuum hose 106*a* via an inlet port 108*i* and the vacuum hose 106*b* via an outlet port 1080 may connect to the vacuum hose 106*b* such that a vacuum on the recycler 102 may apply negative pressure (i.e., pressure below atmospheric pressure, sometimes referred to as vacuum pressure) to draw low pressure or negative pressure air flow through the vacuum hose 106*b*, conditioner 104, and vacuum hose 106*a*. It should be understood that the outlet port 1080 may be positioned as a fixed pipe beneath a funnel or other feature of the conditioner 104. It should be understood that negative pressure means a pressure below atmospheric pressure that creates a negative pressure airflow capable of pneumatically move abrasive material, such as steel or garnet grit.

In operation, an operator of the recycler 102 may use a blast nozzle to blast the abrasive media onto steel surfaces being prepared for painting or re-painting to strip off the paint. Another operator may use a vacuum nozzle to vacuum the used abrasive media and debris (e.g., shoes, sand, trash, etc.) into the vacuum hose 106*a* into the abrasive media conditioner 104 for processing thereby. The conditioner 104 may perform a pre-classification of the abrasive media and debris using a classifier 110 to separate the abrasive media from the debris. Thereafter, the pre-classified abrasive media may be fed (e.g., using gravity) into a dryer 112 for drying therein.

The dryer 112 may include a conveyor (see FIG. 3) to convey the abrasive media under radiation elements, such as infrared elements. The conveyor may be a vibrating tray that is configured to convey the abrasive media at a certain rate, such as between about 10 feet per minute and 20 feet per minute. If, for example, the conveyor were 10 feet long, a rate of 20 feet per minute causes the abrasive media to move through the dryer within 30 seconds (i.e., 10 feet/20 feet per minute=one-half a minute or 30 seconds). It should be understood that alternative rates may be utilized. Alternative conveyors may be utilized, such as metallic conveyor belts or structures, that are capable of conveying the abrasive media under the radiation elements without deforming within the heat. In an alternative embodiment, rather than using radiation sources, conventional heat source generation, such as heated air or water that pass through heating elements, may be utilized. The heated air or water may include using a flame to heat the air or water. In an alternative embodiment, resistive heat sources (e.g., resistive paint) may be utilized to heat air in which the grit is being conditioned. Other types of radiation sources and non-radiation sources may be utilized and includes some or all of the other functions for sensing, moving, and controlling a conditioner, as described herein.

To power the infrared elements, an onboard engine/electrical generator ("genset") 114 may be utilized. Alternatively, the infrared elements may be powered via a power cord by a power source external from the conditioner 104. Because the speed of negative pressure airflow (also referred to herein as vacuum airflow) is typically greater than 90 mph as a result of the negative pressure being between 15 in-Hg and 29 in-Hg, a vacuum bypass hose 116 may be fluidly coupled to the classifier 110 and an output port (not shown) of the dryer 112. When the abrasive media is dried by the dryer 112, the dried abrasive media may be re-entrained back into the vacuum airflow that passed through the vacuum bypass hose 116 and out the vacuum hose 106*b* for conveyance back to the recycler 102 for further processing. Non-abrasive may be dropped via a chute 118 and into a barrel 120.

Water boils at a lower temperature when in a negative pressure than when in atmospheric pressure. For example, water may boil at 140 degrees Fahrenheit (60 degrees Celsius) in 24.04 in-HG pressure. The conditioner 104 may be configured to maintain negative pressure throughout the entire path in which the abrasive media may flow through the conditioner 104 by having vacuum-tight seals within the classifier 110, dryer 112, and any connecting pathways. By maintaining the dryer 112 under a negative pressure, water or moisture that is on the abrasive media being dried may be evaporated or otherwise removed from the abrasive media faster than if the dryer 112 were operating under atmospheric temperature. The negative pressure may be determined by the negative pressure being provided by the vacuum of the recycler 102 via the vacuum hose 106. In an alternative embodiment, the classifier 110 may operate under atmospheric pressure and the dryer 112 may operate under negative pressure. Still yet, the dryer 112 may operate under atmospheric pressure, but will take longer to dry the abrasive media because of the relative increase in boiling temperature of water in atmospheric pressure than negative pressure. It should be understood that IR heated air naturally has a lower partial pressure of water due to increase in dry bulb temp versus wet bulb temp and also assists in the drying process. In an alternative embodiment, rather than using heated air, a freeze drying process that condenses water out of air may alternatively be utilized. Using lower partial pressures is typically more efficient than conditioning the air first as a drying media (i.e., utilizing lower partial pressure of water in a negative relative pressure provides more efficiency than conditioning the air).

The conditioner 104 is shown to be mobile as the conditioner 104 includes a trailer 122 with tires 124. Because the conditioner 104 is mobile, the conditioner 104 may be more easily be moved between jobsites and more easily moved on a jobsite. Because many jobsites are at bridges that require equipment, such as the recycler 102 and abrasive media conditioner 104 to be moved off the roadway during the day while operations are ceased and then back onto the roadway at night for operations, the ability to move the conditioner 104 using a pickup truck 200*a* (FIG. 2A) or other small vehicle makes it convenient for contractors to integrate the conditioner 104 with the recycler 102 and then move the conditioner 104 by simply disconnecting the vacuum hose 106*b* to move the conditioner 104.

In an embodiment, a controller 132 may include electronics, such as analog electronics and/or digital electronics, that may include a level sensor or angle sensor configured to sense angles along X- and Y-axes and configured to drive each of the jacks to raise and lower to cause angles along the X- and Y-axes to automatically be within predetermined angles (e.g., +/−1 degree from horizontal) prior to operating the conditioner. In one embodiment, a bubble sensor for X- and Y-axes may be utilized. In an alternative embodiment, the jacks 126 may include manually controllable jack features, such as cranks with screw drives, that enable the jacks to be raised and lowered for altering angle of the conditioner 104, thereby establishing angle of the conveyor within the dryer 112. If the conveyor is a belt or other system other than a vibratory table or a rotating drum, then the angle of the conditioner may be less sensitive to the angle.

Figure 2A:
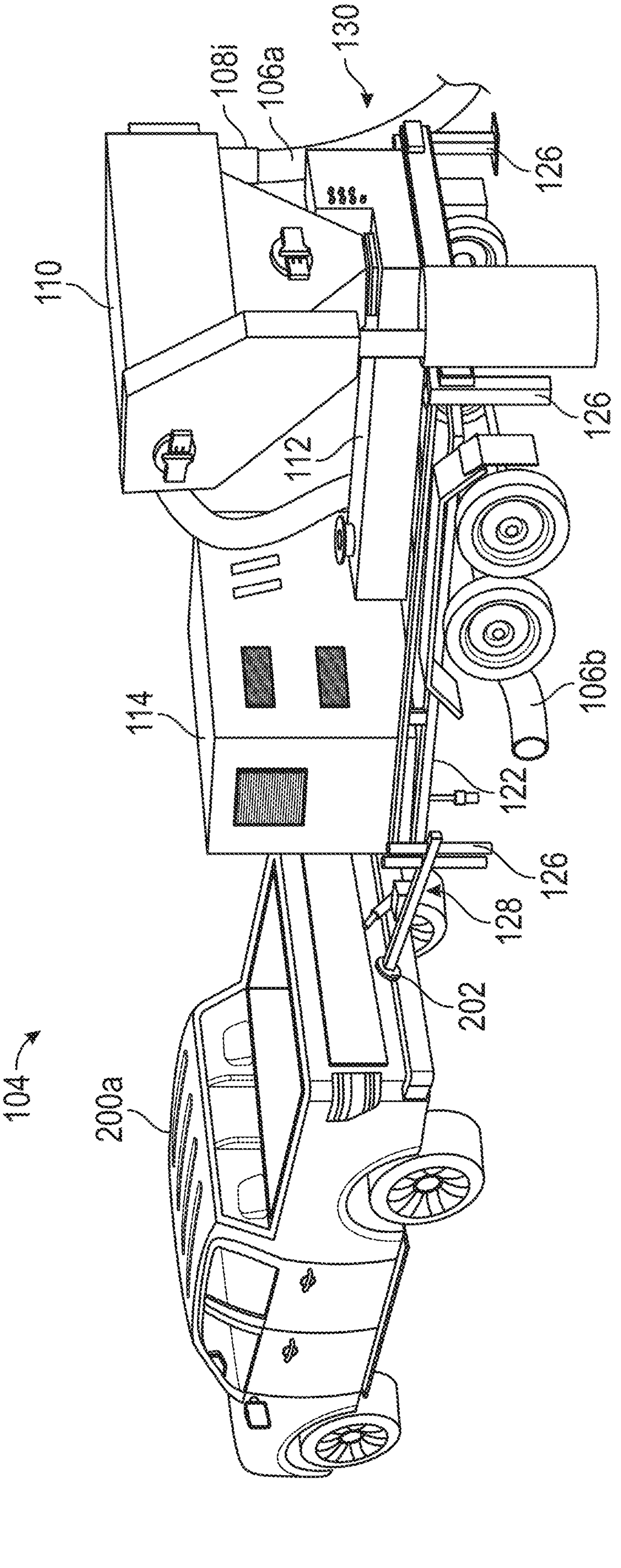
FIG. 2A is an illustration of an embodiment conditioner of the conditioner of FIG. 1 for conditioning abrasive media and being pulled by a pickup truck.

With regard to FIG. 2A, an illustration of an embodiment conditioner 104*a* of the conditioner 104 of FIG. 1 for conditioning abrasive media and being pulled by a pickup truck 200*a* is shown. The trailer 122 may be connected to a hitch 202 of the pickup truck 200*a* for towing the conditioner 104*a*. In addition to the trailer 122 being used for towing or otherwise moving the conditioner 104*a*, the trailer may have one or more adjustable jacks 126 at the front or gooseneck 128 and rear 130 of the trailer 122. The adjustable jacks 126 may be used to level and optionally slightly angle the conditioner 104*a* such that the dryer 112 is within an angle range to enable the conveyor to properly move the abrasive media. For example, the angle of the conditioner may be set to be level to within 1-degree of horizontal in both X- and Y-axes such that the abrasive media flows longitudinally along the conveyor at a certain predetermined rate and has little or no bias towards a left or right side of the conveyor during operation of the conveyor while drying the abrasive media.

Figure 2B:
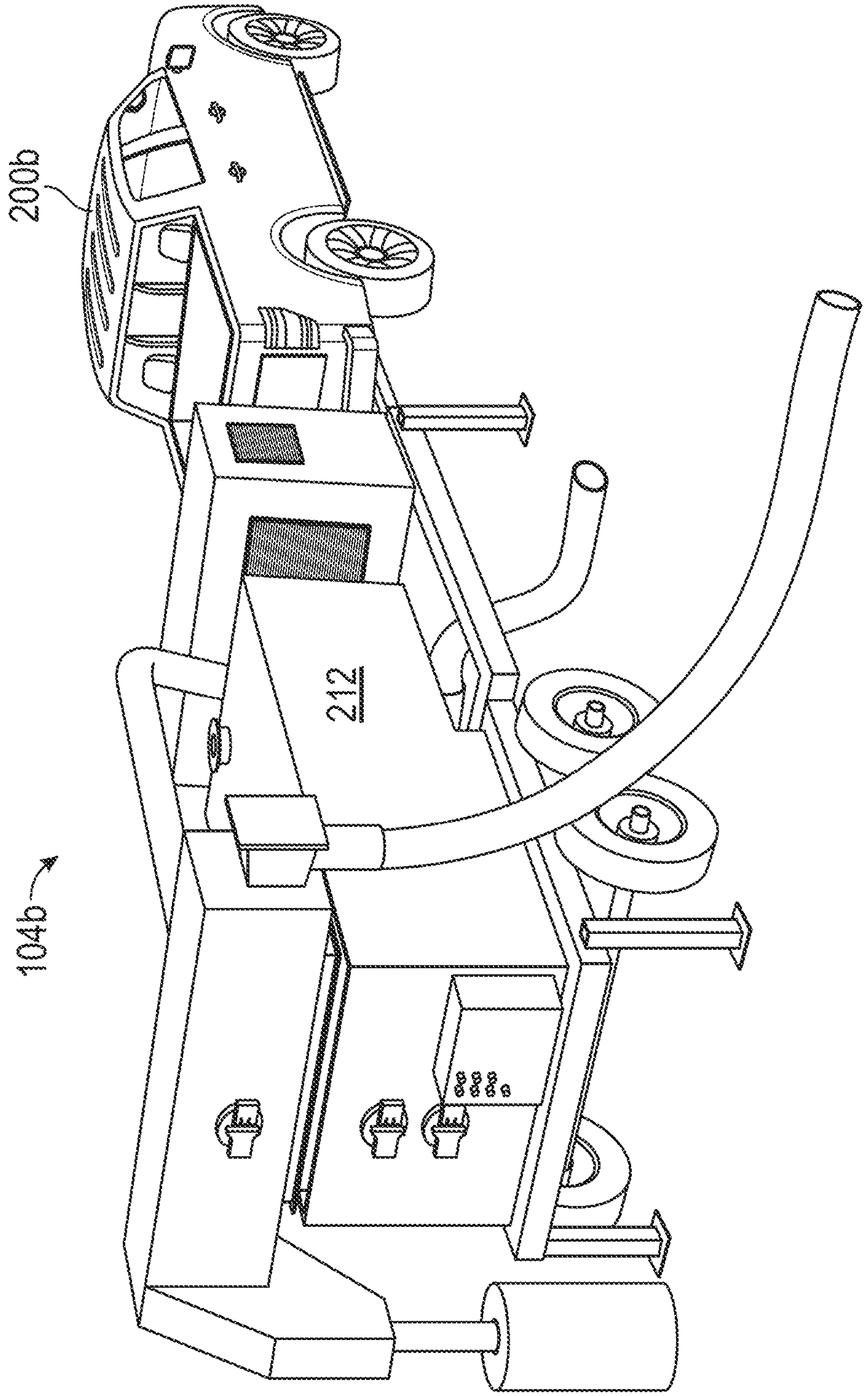
FIG. 2B is an illustration of another embodiment conditioner of the conditioner of FIG. 1 for conditioning abrasive media and being pulled by a pickup truck.

With regard to FIG. 2B, an illustration of another embodiment conditioner 104*b* of the conditioner 104 of FIG. 1 for conditioning abrasive media and being pulled by a pickup truck 200*b* is shown. The conditioner 104*b* may provide for the same or larger capacity of conditioning abrasive media than the conditioner 104*a* of FIG. 2A. As shown, a dryer 212 may be larger in height and width than that shown for the dryer 112 of FIG. 2A.

Figure 3A:
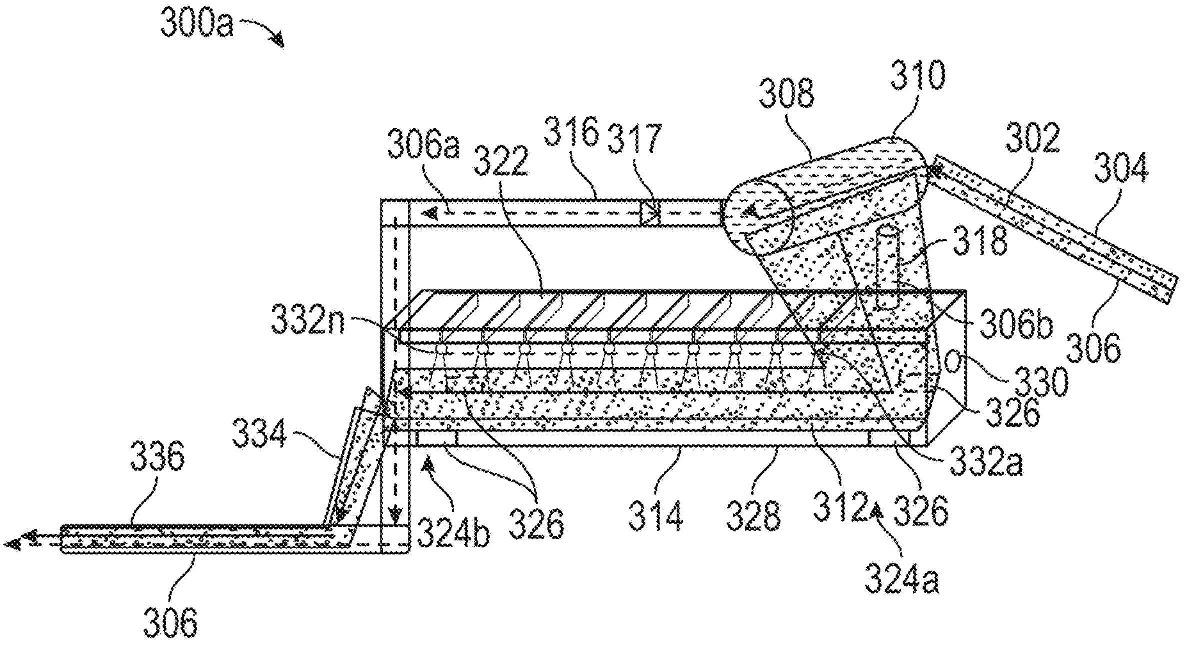
FIG. 3A is an illustrative schematic of the conditioners of FIGS. 2A and 2B showing flow of abrasive media and negative pressure airflow.

With regard to FIG. 3A, an illustrative schematic 300*a* of the conditioners 104*a* and 104*b* of FIGS. 2A and 2B showing flow 302 of abrasive media 304 and negative pressure airflow 306 is shown. The abrasive media 304 may be both dry and wet grit as recovered by vacuuming or otherwise from a treatment site. In other words, the abrasive media 304 may be fully, intermittently, or not wet depending on weather or processing technique (e.g., "dustless blasting," which injects mist or larger amounts of water into the blast stream) during blasting operations, and because rain or water that comes in contact with the blasted abrasive media 304 may occur intermittently, the abrasive media 304 may intermittently have moisture mixed therewith when the abrasive media 304 is vacuumed or otherwise brought into the conditioner. Moreover, the abrasive media 304 may be blasted on a humid day or be vacuumed in the morning or other time when condensation builds on the abrasive media 304. In this embodiment, the negative pressure airflow 306 being drawn through a vacuum hose is used to move the abrasive media 304 into the conditioner.

The abrasive media 304 may be initially drawn into a pre-classifier, which in this case includes a trommel 308 (i.e., a tubular structure inclusive of openings 310 defined by the tubular structure along a length of the tubular structure). In an embodiment, the openings 310 defined by the tubular structure may have a diameter between about ⅛ to about ¼ of an inch (typically 3/16 of an inch), for example, so as to enable the abrasive media 304 to be dropped through the openings 310 as the trommel 308 is rotated. It should be understood that the diameter of the openings 310 may be different than between about ⅛ inch and ¼ inch depending on the size of the abrasive media 304 or otherwise. If any larger sizes are used, then other dimensions and parameters may additionally be scaled to accommodate larger abrasive media 304 and debris passing therethrough. The size of the openings 310 may be different along the trommel 308, such as smaller on the inlet end and larger towards and at the outlet end, thereby releasing less abrasive media 304 at the inlet end and more at the outlet end, which may help in outputting the abrasive media 304 more equally across the length of the trommel 308.

In another embodiment, the openings 310 may have a different density extending from a proximal end from where the abrasive media 304 enters the trommel 308 to a distal end opposite that of the proximal and. The different density of openings 310 means that the number of openings 310 around the circumference of the trommel 308 may vary in number along the trommel 308. For example, the number of openings 310 at the proximal end may be 20 and increase linearly or otherwise towards the distal end, where a number of openings 310 may be 100, thereby ensuring that the amount of abrasive media 304 that drops through the openings 310 of the trommel 308 is reasonably consistent in terms of volume from the proximal end to the distal end of the trommel 308. By the trommel 308 releasing reasonably consistent volume across the trommel 308, volume of the abrasive media 304 that is applied to a conveyor 312 of dryer 314 may be consistent from one side to the other side of the conveyor 312, thereby forming a consistent depth across the conveyor 302 for drying the abrasive media 304 while in the dryer 314. Because the openings 310 of the trommel 308 has a defined diameter, debris that is larger than the diameter of the openings flows through the entirety of the trommel 308 and drops out of the trommel 308 into the chute 118 of FIG. 1.

The trommel 308 may be driven by an electric or hydraulic motor (not shown) that uses a chain, gear train system, or with a pin-gear drive (not shown). The gear train system, one embodiment being a pin gear style driven system, may be driven by a right-angle drive that provides for a reduction gear ratio such that a motor may speed faster (e.g., 1800 rpm) than rotation of the trommel 308, which may be operating between 5 and 10 revolutions per minute, which means there is a 1:225 ratio between speed of the motor and trommel 308. Alternative speeds of the motor and trommel 308 may be utilized, and alternative gear ratios may be utilized, as well.

Although not shown, the trommel 308 is part of the classifier 110 and includes a housing, such as shown in FIG. 1, that surrounds the trommel 308. The housing may be vacuum-sealed, thereby enable the abrasive media 304 to be processed in negative pressure (see FIG. 3B, for example). Moreover, the vacuum airflow 306 may enter into the trommel 308 and a bypass vacuum airflow 306*a* may exit out into a conduit 316 to bypass the dryer 304. In one embodiment, a valve 317, which may be a butterfly or other valve type, may be disposed before or within the bypass hose 316 such that if the valve 317 is partially closed, then more vacuum airflow 306 will flow through to a manifold 318, as further described herein. If the valve 317 is fully open, then more vacuum airflow 306 will flow through the bypass hose 316. In an embodiment, a manifold 318 may have one or more conduits may extend from the trommel 308 to the dryer 314 so as to enable a fraction of vacuum airflow 306*b* to pass from the trommel 308 to the dryer 314. Although shown as circular, the manifold 318 may be elongated with a single or multiple conduits for the fraction of vacuum airflow 306*b* to pass therethrough. In an embodiment, the fraction of vacuum airflow 306*b* may range from about 5% to about 25% of the total of the vacuum airflow 306 because some amount of airflow may be passed through the dryer to cause moisture or humidity from the abrasive media 304 being removed from the abrasive media 304 in the dryer 314 to be exited from the dryer 314. The fraction of vacuum airflow **306*b* may also be used to cause a convection drying process in the dryer 314**.

The dryer 314 may include the conveyor 312 for moving the abrasive media 304 beneath heat sources 322 at a given rate. In an embodiment, the conveyor 312 may be a vibratory tray that is configured to vibrate to cause the abrasive media 304 to move from a first end **324*a* to a second end 324*b* of the vibratory tray. The vibratory tray may use vibrational tray principles, including applying frequency and amplitude from a motor and/or other vibratory element(s) attached to the vibratory tray to cause material, such as the abrasive media 304, move at a certain rate along the conveyor 312**.

The heat sources 322 may be radiation elements, such as infrared (IR) heat lamps. The heat sources 322 may extend laterally within the dryer 314 such that each of the heat sources 322 may heat the abrasive media 304 as it flows across different portions of the conveyor 312. In an embodiment, the heat sources 322 may extend above and laterally across the conveyor 312 and be 12 inches in width. The heat sources 322 may be positioned about 6 inches to about 12 inches above the conveyor, although alternative heights may be utilized depending on the heat sources 322 and type of abrasive material 304 being dried. Other factors may help establish height of the heat sources 322.

The length and width of the conveyor 312 may be established depending on the volumetric rate (e.g., cubic feet per minute) of abrasive material to be processed (e.g., 6 tons per hour) and time that the abrasive material 304 is to be conditioned for drying. Multiple heat or radiative sources may be specified to accommodate a desired rate of drying of the abrasive media. In one embodiment, the conveyor 312 is 4½ feet wide, then the heat sources 322 may be 0.5' wide×12" long, which means a 10' long conveyor may have up to 108 heat sources that extend across the entirety of the conveyor 312 on a per foot basis. Alternative dimensions of heat sources may be utilized, such as heat or radiative sources 322 that are half as wide so two times as many heat sources may be horizontally aligned so as to create a full width heat source. However, to avoid having a cool zone along a central zone of the conveyor 312 due to having housing elements between the half-width heat sources 322, a full width heat source 322 may be utilized.

Depending upon the amount of heat that the heat sources 322 are to generate, the genset 114 may be configured to output sufficient power. For example, the genset 114 may be configured to output as much power as is needed to operate the heat sources 322 and any other electrical components, such as an electric motor used to drive the trommel 308. The heat sources 322, in an embodiment, may produce 25 watts per square inch. In one embodiment, if 10 heat sources 322 are utilized to heat a 4½ foot wide conveyor 312, then a genset 114 that is capable of generating approximately 175 kW may be used to drive the heat sources and other electrical components. It should be understood that alternative configurations of heat sources 322, genset 114, and conveyor 312 may be utilized.

Figure 3B:
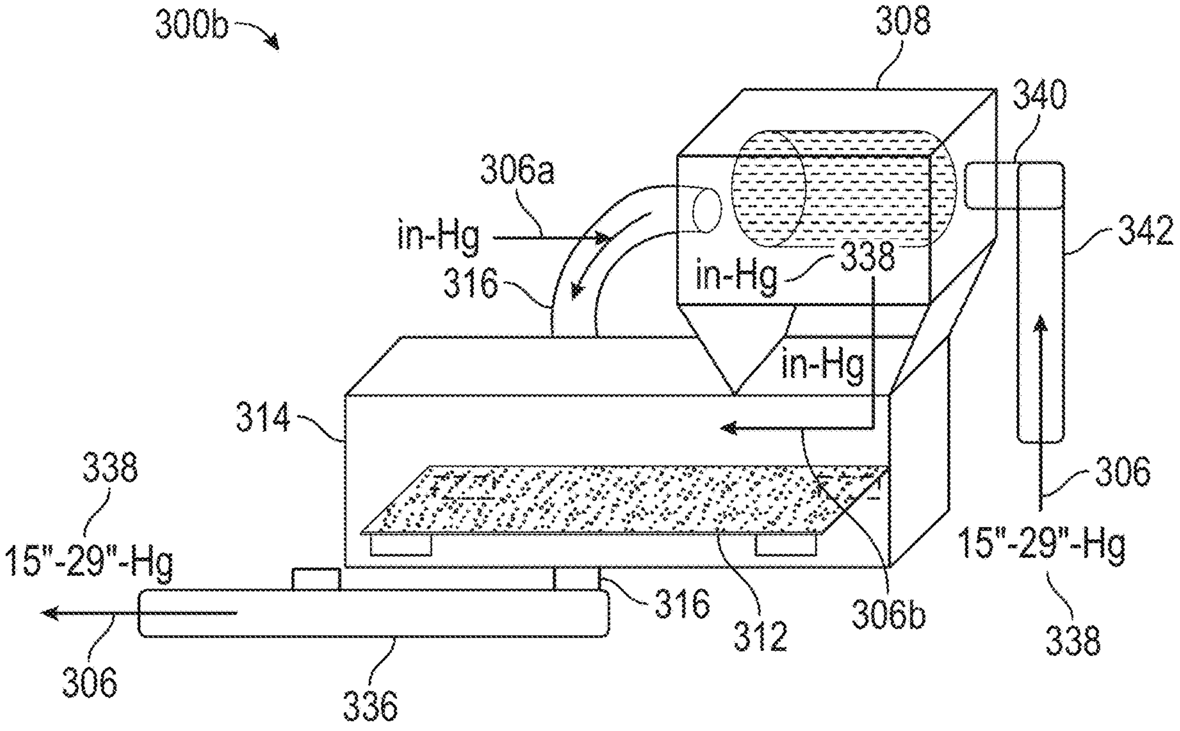
FIG. 3B is another illustrative schematic of the conditioners of FIGS. 2A and 2B showing negative pressure and negative pressure airflow throughout the conditioner.
Figure 3C:
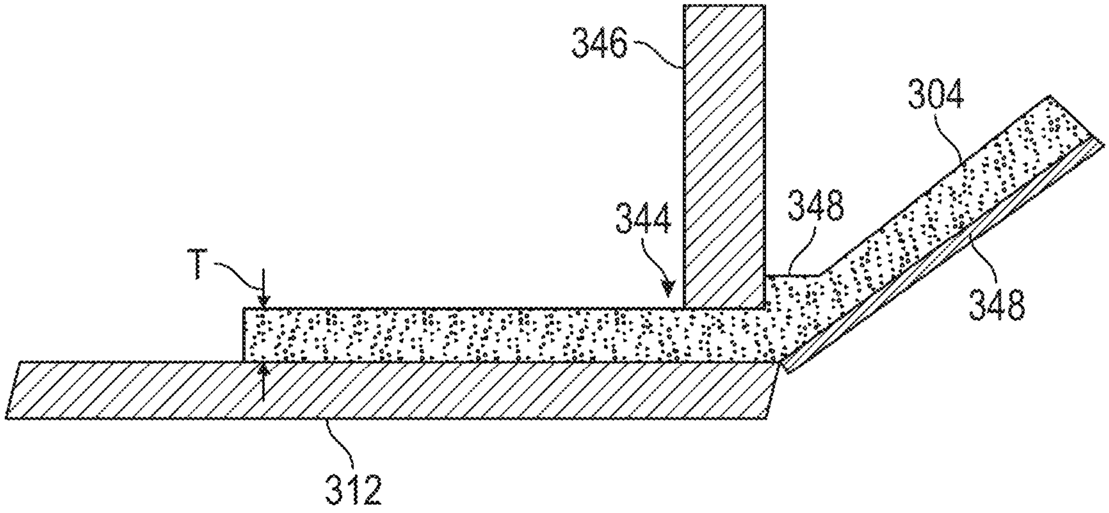

To ensure that the amount of abrasive media 304 across the conveyor 312 is consistent in depth, a slot may be established by a structural feature, such as a wall, wire brush, or otherwise, at the first end **324*a* (see FIG. 3C). In an embodiment, the slot may be positioned above the conveyor 312 so that the conveyor 312 naturally draws the abrasive media 304 thereon, whether the conveyor 312 is a belt, vibratory tray, or otherwise. The slot functions to limit height of the abrasive media 304 entering onto the conveyor 312, thereby ensuring that depth of the abrasive media 304 at any lateral position on the conveyor 312** is limited to the height of the slot.

In an embodiment, airbags 326 may be disposed between the conveyor 312 and a floor 328 (or other structure) on which the conveyor 312 is supported. The airbags 326 may be inflated by an air pump 334 during operation of the conveyor 312. In the event that the conveyor 312 is a vibratory tray, then the airbags 326 may serve to tune the vibratory tray such that performance of the vibratory tray is able to efficiently move the abrasive media 304 from the first end **324*a* to the second end 324*b*. In other words, the amount of air pressure in the airbags 326 may assist in tuning the operation of the vibratory tray. When the conditioner is to be moved from one jobsite to another or within a single jobsite, the airbags 326 may be deflated by the air pump 330 to cause the conveyor 312 to rest on the floor 328, thereby reducing damage that may otherwise occur as a result of the conveyor 312 being positioned on the inflated airbags 326 and potentially hitting a resonant frequency while moving, for example. The air pump 330 may be controlled manually or automatically by a controller, such as controller 132 of FIG. 1, that is automatic or manually operated. If automatically operated, the controller 132 may sense horizontal motion or an electrical signal, such as an electrical signal to tail lights or other electrical component on the trailer of the conditioner. Rather than using airbags 326, other devices, such as springs, may be used to provide vertical support to the conveyor 312. However, the airbags 326 may enable tuning operation of the conveyor 312 and provide the ability to be deflated so as to limit damage to the conveyor 312** during movement of the conditioner.

In one embodiment, sensors **332*a*-332*n* (collectively 332) may be dew point sensors that are configured to sense dew point temperature. Although multiple sensors 332 are shown, in an alternative embodiment, a single sensor may be utilized. However, by including multiple dew point sensors along the conveyor 312, additional resolution may be possible so as to provide additional dew point data that may be used to determine when the abrasive media 304 is dried within the conveyor 312. In an alternative embodiment, the sensors 332 may be an alternative type of sensor, such as a heat sensor, that may sense temperature of the abrasive media 304 and a correlation or other function may be made to determine whether or not the abrasive media 304 is dried at a certain location within the conveyor 312**.

Because the heat sources 322 may consume significant energy, the sensors 332 with respective fields-of-view or sensor zones may be disposed along a length of the dryer 314 overlooking the conveyor 312 and abrasive media 304 disposed to sense measurements therein. In an embodiment, rather than using dew point sensors, the sensors 332 may be temperature sensors, such as infrared sensors, that are capable of sensing thermal temperature of the abrasive media 304 being dried by the heat sources 322. However, because dew point is more indicative of dryness of the abrasive media 304, additional sensing, such as humidity or outside versus inside temperature, may additionally need to be made. To reduce the amount of power being consumed, measurements (e.g., dew point, temperature, etc.) as measured by each of the sensors 332 may be used to determine whether or not the abrasive media 304 is dry based on the temperature.

In an embodiment in which dew point sensors are utilized, testing for dew point along the length of the conveyor 312 may be performed because moisture level in the abrasive media 304, position from the first end 324*a* of the conveyor 312, and/or otherwise may be determined. For example, if the dew point level crosses a predetermined threshold, such as wt % of 0.01%, at the fourth of the sensors 332, then a determination may be made that the abrasive media 304 being dried is sufficiently free of moisture. Such determinations may be made using other types of sensors.

In an embodiment in which temperature sensors are utilized, testing for temperature of dry abrasive media 304 along the length of the conveyor 312 may be performed because temperature may range based on external temperature, moisture level in the abrasive media 304, position from the first end 324*a* of the conveyor 312, and/or otherwise may be determined. For example, if the temperature crosses a predetermined temperature threshold, such as 250° F., at the fourth of the temperature sensors 332, then a determination may be made that the abrasive media 304 being dried is sufficiently free of moisture.

A controller, such as controller 132, may be configured to transition any of the heat sources 322 beyond (i.e., towards the second end 324*b*) the sensor 332 that sensed that a condition in the conveyor 312, such as dew point being below a predetermined dew point level, or temperature of the heated abrasive media 304 being above a threshold temperature, from an ON state to an OFF state, thereby saving electrical power. The controller 132 may be analog or digital. It should also be understood that if the dew point of the air or temperature of the abrasive media 304 being dried by the heat sources 322 are above or below a respective threshold level, then any heat sources 322 beyond the sensor that sensed the dew point or temperature of the abrasive media 304 being above the dew point threshold or below the temperature threshold may remain ON or be transitioned to an ON state. Because temperature of the abrasive media 304 may be different along the conveyor 312 (e.g., temperature indicative of dry abrasive media 304 at the first, second, and third of the temperature sensors 332 may be ramping up), different temperature thresholds may apply, but operationally as a function of an outdoor temperature.

The controller 132 may further be configured to control speed of the abrasive media 304 moving on the conveyor 312. The controller 132 may allow for multiple modes, including a fast pass and a slow pass. The fast pass may move at a rate that is meant to operate when humidity rises above a certain dew point, such as 60 percent relative humidity, or if an operator feels that the abrasive media 304 may have some, but not a lot of moisture contained thereon. A user interface (e.g., push-button) may be provided for an operator to select fast pass or slow pass. Alternative speed modes may be available, as well.

The controller 132 may further be configured to automatically turn ON the heat sources 322 (e.g., radiative sources) when humidity is above a threshold humidity, such as 60 percent humidity or when rain has fallen within a certain amount of time from operation, such as within 2 hours. A humidity sensor and/or rain sensor may be local to the conditioner or external weather data may be received from a communications channel (e.g., satellite, cellular, Wi-Fi, or other channel). Still yet, an operator may be given access to manually override the controller 132 to turn ON and turn OFF the heat sources 322. In an embodiment, if it is determined that no moisture exists, then a bypass valve and conduit may be used to avoid passing the abrasive media 304 through the conditioner at all.

As the abrasive media 304 exits from the conveyor 312 as dried abrasive media 304, the abrasive media 324 may be passed through a structure 334, such as a funnel, to be re-entrained into the bypass vacuum airflow 306*a* along with the fraction of vacuum airflow 306*b* into conduit 336 to be flowed to a recycler, such as recycler 102 of FIG. 1 or otherwise.

With regard to FIG. 3B, another illustrative schematic of the conditioner 104*a* and 104*b* of FIGS. 2A and 2B showing negative pressure 338 and negative pressure airflow 306 throughout the conditioner is shown. Typical negative pressures of a recycler 102 are between 15 inches of mercury (in-Hg) and 29 in-Hg. Negative pressure airflow 306 is typically 90 mph or higher because 90 mph is the capture velocity of steel grit. As understood in the art, velocity is a function of both area and differential pressure, and may change with density of air due to temperature such that speed of the abrasive media 304, such as steel grit, may vary under different area and differential pressure conditions. As indicated, the vacuum airflow 306 may extend through an inlet port 340 from a vacuum hose 342 and through the trommel 308. From the trommel 308, a bypass vacuum airflow 306*a* may flow via bypass hose 316 and fraction of vacuum airflow 306*b* may flow through the dryer 314. The airflows 306*a* and 306*b* may be recombined when the dried abrasive media 304 is re-entrained into the bypass vacuum airflow 306*a* in the conduit 336 such that the dried abrasive media 304 is flowed out the conduit 336 to a recycler or other system. The dryer 314 may be maintained at negative pressure 338, such as between 15-29 in-Hg, as created by a vacuum from the recycler, which helps in removing moisture from the abrasive media 304 being dried in the dryer 314 because water boils at lower temperatures under negative pressures.

With regard to FIG. 3C, a side view illustration of an illustrative slot 344 defined between the conveyor 312 and an abrasive media thickness limiter 346, which may be a vertical or other angled wall, that is positioned at an entrance for the abrasive media 304 to flow onto the conveyor 312 from a feeder surface 348 is shown. The feeder surface 348 is shown to have about a 45-degree angle, but any angle that enables the abrasive media 304 to flow onto the conveyor 312 may be utilized. As shown, the abrasive media thickness limiter 346 may limit thickness T of the abrasive media 304 so that the heat sources 322 may be sufficient to heat the abrasive media 304 for drying within a length of the conveyor 312 within a given time period (e.g., less than 30 seconds). If the abrasive media 304 is flowing with too much volume down the feeder surface 348, then excess abrasive media 348 will stack up in front of the abrasive media thickness limiter 346, but because the thickness limiter 346 is positioned above the conveyor 312, as the conveyor draws more of the abrasive media 304 away from the thickness limiter 346 (e.g., vibrational translation, translation, etc.), the excess abrasive media 348 will be drawn down. It should be understood that alternative embodiments of the thickness limiter 346 may be utilized.

In an embodiment, a manifold, such as the manifold 318 of FIG. 3A, may extend along above the excess abrasive media 348 to direct the fraction of vacuum airflow 306*b* or a fraction of the fraction of vacuum airflow 306*b* to flow towards the slot 344, thereby limiting the ability for the excess abrasive media 348 from growing too large or remaining above the slot 344 after the abrasive media 304 finishes passing through the slot 344.

In an embodiment, the abrasive media thickness limiter 346 may be positioned such that the slot 344 is about 0.15 inches (3.81 mm) above conveyor 312, about 0.10 inches (2.54 millimeters) above the conveyor 312, or about 0.05 inches (1.27 mm) above the conveyor 312 such that the thickness of the abrasive media 346 on the conveyor 312 may be less than about 0.15 inches (3.81 mm), less than about 0.1 inches (2.54 millimeters), or less than about 0.05 inches (1.27 mm), respectively. It should be understood that thicker layers of abrasive media 304 may be utilized, but drying criteria is to be met with the dimensions of the conveyor 312 and capacity of the heat sources 322. If the heat sources 322 are IR lamps, then the IR signals, which may be medium wavelength IR signals, are to be capable of passing through the depth of the abrasive media 304.

Figure 4A:
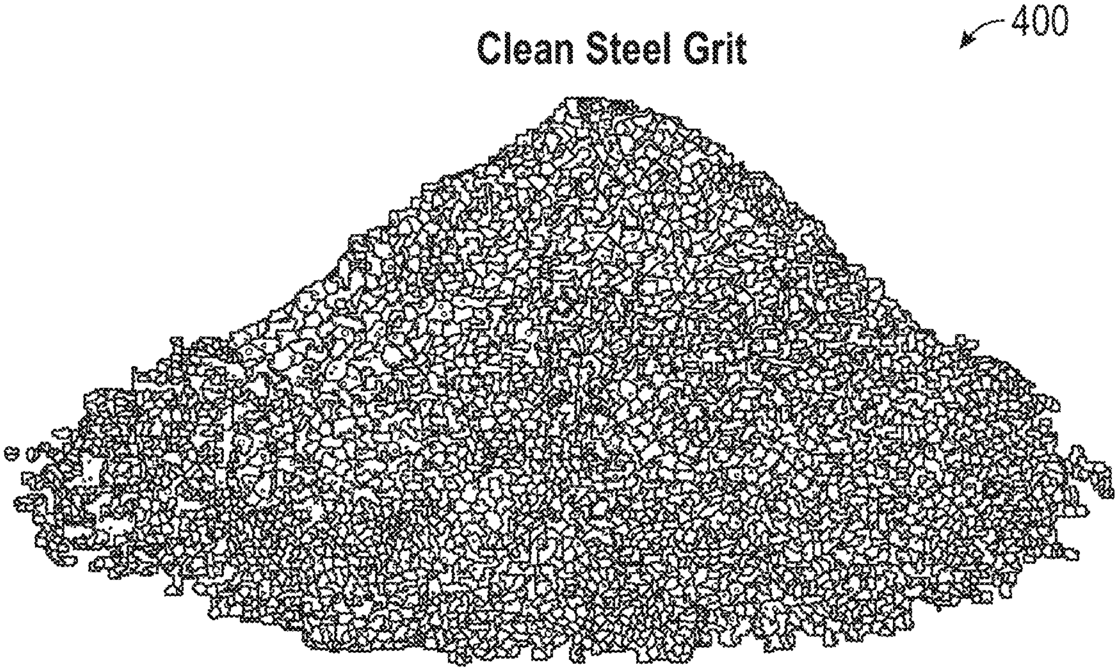
FIG. 4A is an image of illustrative clean steel grit.

With regard to FIG. 4A, an image of illustrative clean steel grit 400 is shown. The clean steel grit 400 is loose grains of steel that are able to flow fluidly across surfaces and through conduits.

Figure 4B:
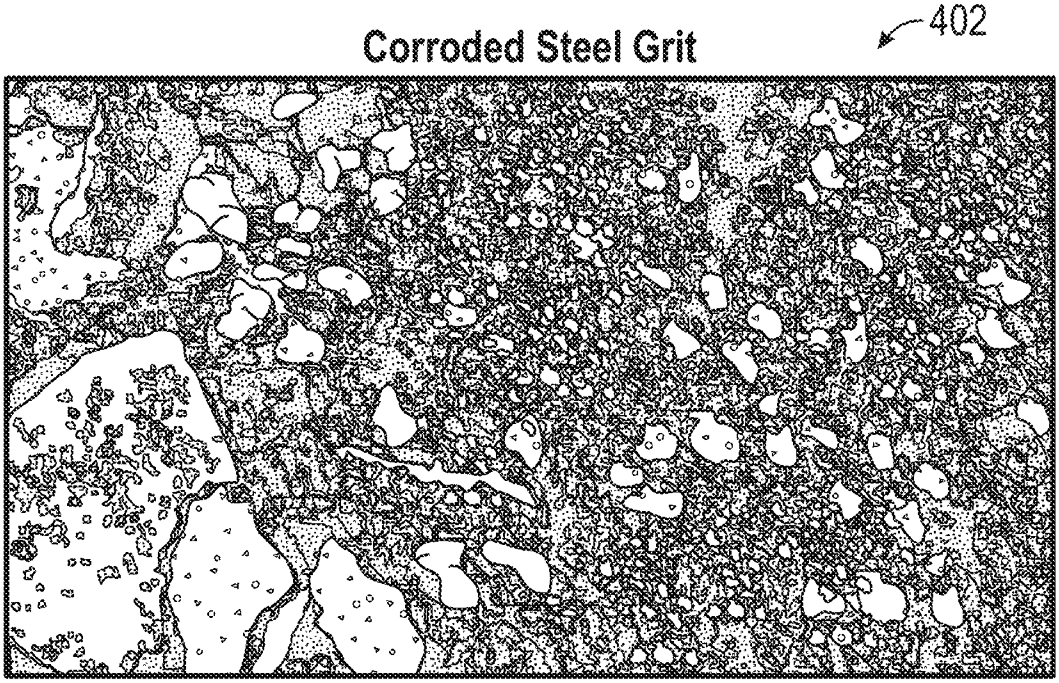
FIG. 4B is an image of illustrative corroded steel grit on a job site.

With regard to FIG. 4B, an image of illustrative corroded steel grit 402 on a job site is shown. The corroded steel grit 402 is a result of becoming corroded through moisture remaining in contact with clean steel grit 400 for a significant amount of time that the grains of the steel grit adhere to one another, thereby forming "rocks" or clusters of steel grit and corroding or rusting. The corroded steel grit 402 may be difficult, if not impossible, to process with a recycler, and the clusters of steel grit will likely be filtered out by a pre-classifier, such as a trommel. Even if an operator vacuums the steel grit prior to becoming corroded, moist steel grit tends to clog up a recycler, so the use of a conditioner to dry the steel grit allows for the still grit to remain usable, such as the clean steel grit 400 of FIG. 4A.

Figure 5A:
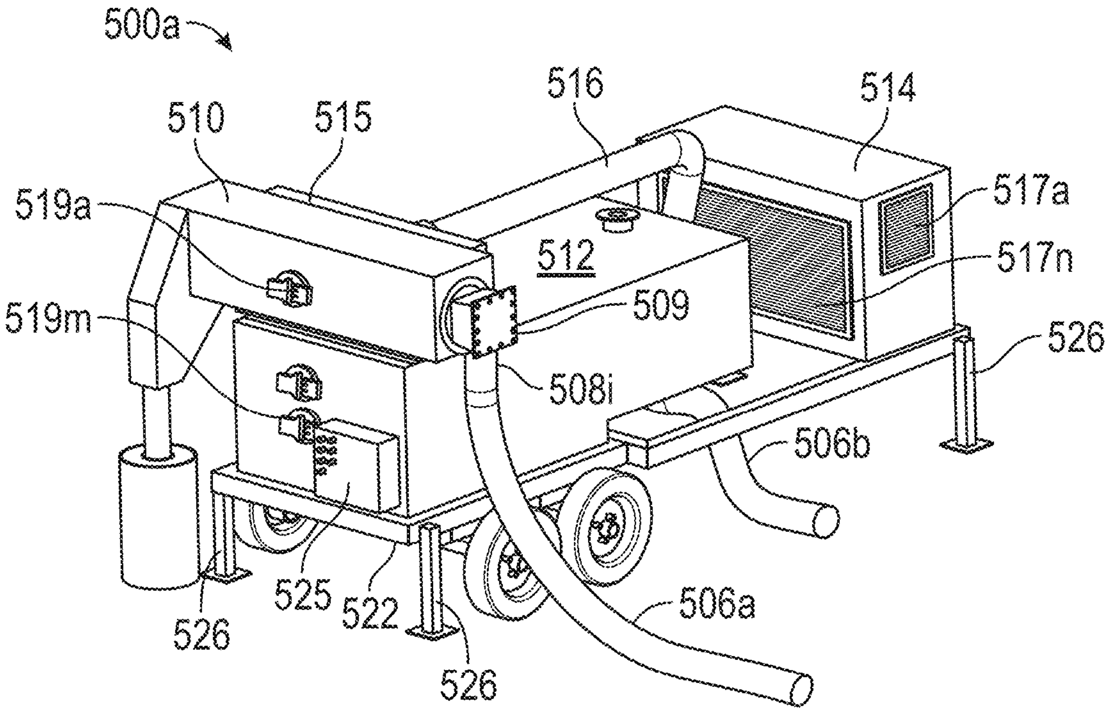
FIGS. 5A-5H are illustrations of an illustrative conditioner for use in conditioning abrasive media that shows different views and ornamental features of the conditioner in each of the views.

FIGS. 5A-5H are illustrations of an illustrative conditioner 500*a*-500*h* (collectively and individually conditioner 500) for use in conditioning abrasive media that shows different views and ornamental features of the conditioner in each of the views. FIG. 5A is a rear-top perspective view that shows a vacuum hose 506 connected to an inlet port 508*i* and inlet elbow 509 that includes a urethane liner to reduce wear of an inside wall thereof because the abrasive media being vacuumed hits a wall, often angled at 45 degrees to slow and reflect the abrasive media into a classifier 510 that functions to separate the abrasive media from larger debris. It should be understood that the shape of the inlet elbow 509 may be any other shape and function to reduce speed of the abrasive media in the negative pressure airflow. The shape of the classifier 510 may be any other shape, as well. A dryer 512 may be configured to dry the blast media received from the classifier 510. As shown, the classifier 510 uses gravitational forces to drop the classified abrasive media into a drying region, as previously described. The dryer 512 is shaped as a rectangular box with various deviations from being perfectly rectangular, and have a longer axial length along a trailer 522 than width.

A vacuum bypass hose 516 may extend from an air collector box 515 extending from a front wall of the classifier 510 to beneath the dryer 512. It should be understood that the location of the vacuum bypass hose 516 extending from a front of the classifier 510 may be different (e.g., from the top, side, or bottom) and path of the vacuum bypass hose 516 extending above and in front of the dryer 512, but may have any other path, such as to the side, through an additional housing structure, or not centered above and in front of the dryer 512. Moreover, rather than using a tubular hose, any other structure and shape may be utilized. The vacuum bypass hose 516 may serve as an "elephant" ornamental appearance. Vacuum hose 506*b* is configured to enable the negative pressure airflow that is drawn through the vacuum bypass hose 516 (without abrasive media) and that collects dried abrasive media from beneath the dryer 512. Jacks 526 may be used to stabilize and orient (e.g., establish a proper slope of the conditioner 500*a* and/or dryer 512).

Figure 5B:
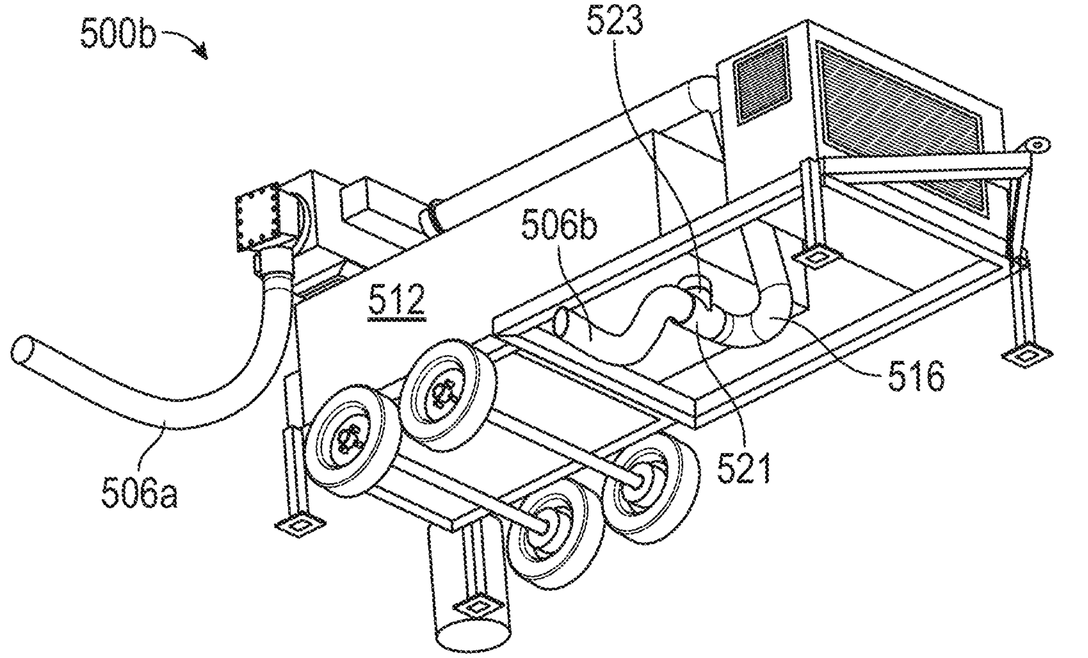
Figure 5C:
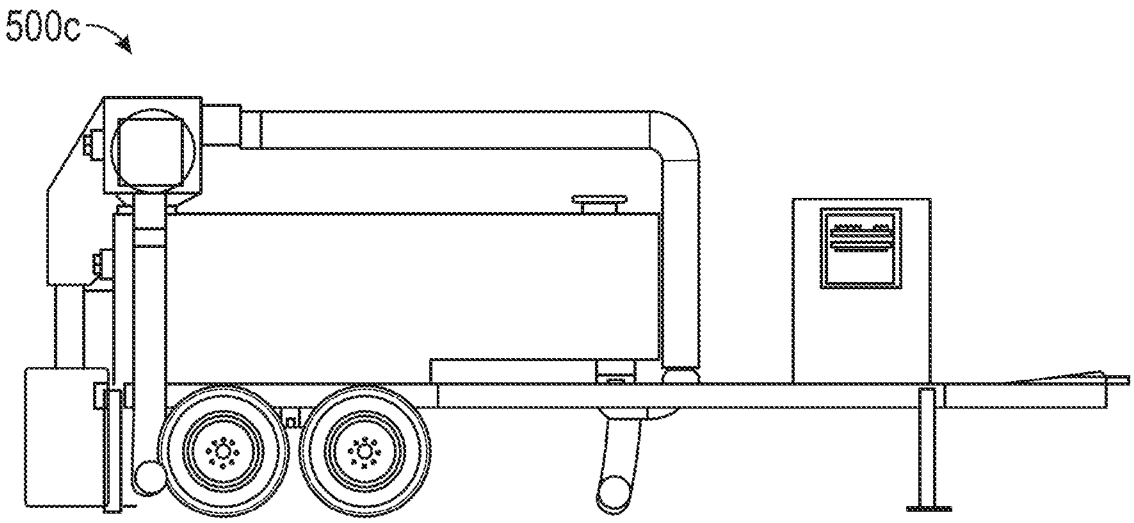
Figure 5D:
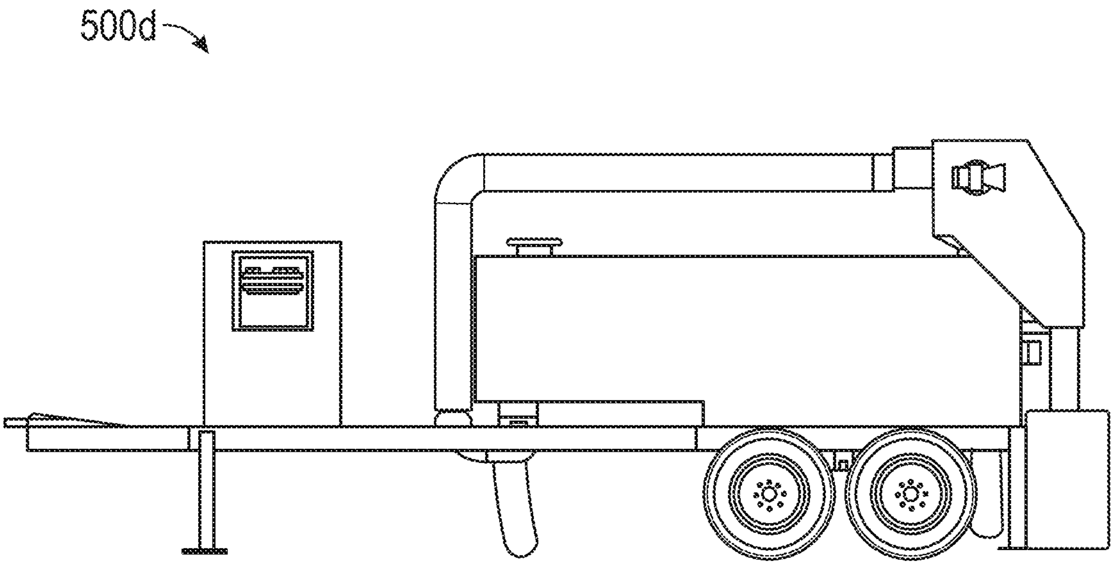
Figure 5E:
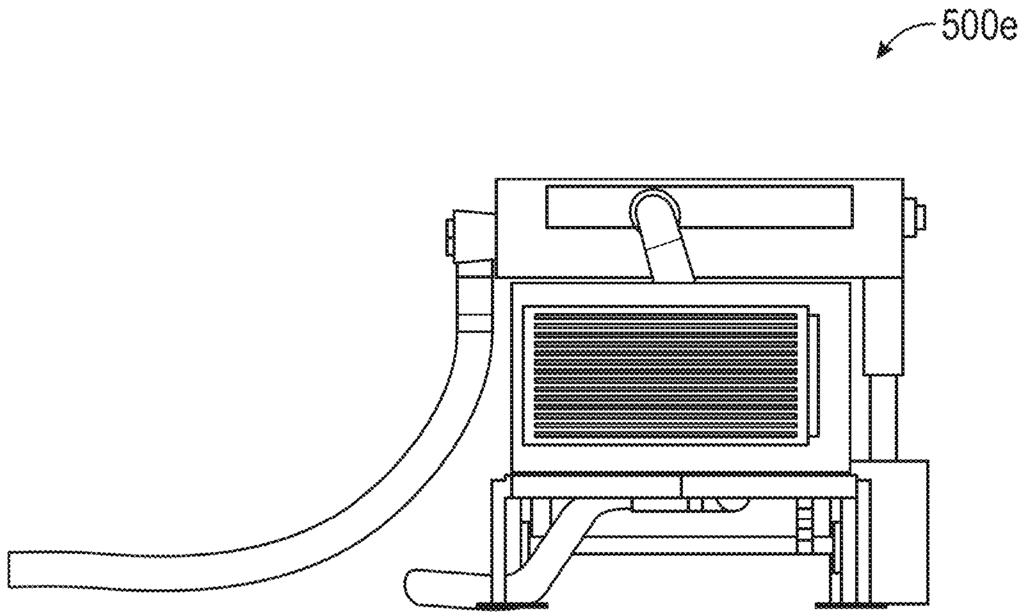
Figure 5F:
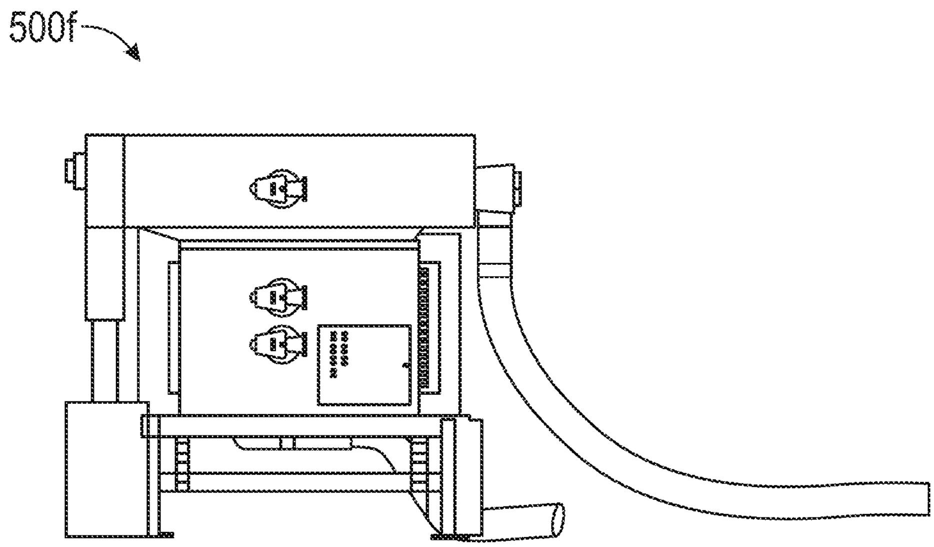
Figure 5G:
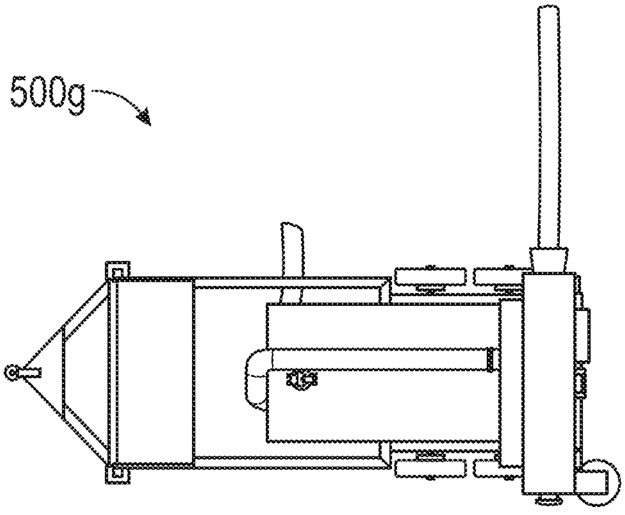
Figure 5H:
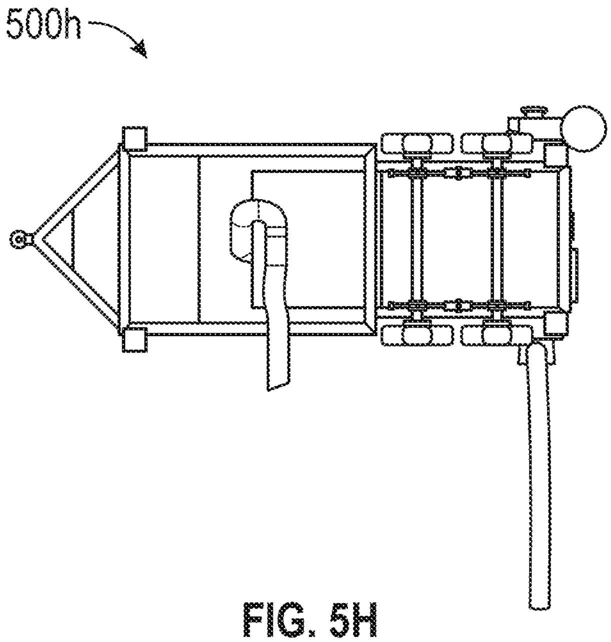

A genset 514 is shown to be oriented horizontally aligned on the trailer 522. In some cases the conditioner 500*a* may be powered by an extension cord from an off-board power source, so the genset 514 is optional on some conditioners. The genset 514 may also include air vents 517*a*-517*n* (collectively 517) on various walls of the genset 514 so as to cool a generator of the genset 514. The shape and position of the air vents 517 may be varied. Access ports 519*a*-519*m* (collectively 519) may enable an operator to view and/or access various components of the conditioner 500*a*. The access ports 519 may be sized, shaped, and positioned in various manners and are optionally included. As shown in FIG. 5B, a front-bottom perspective view of the conditioner 500*b* shows how the vacuum bypass hose 516 connects into a T-connector 521 without a dropdown conduit 523 extending from the dryer 512 for dried abrasive media to be re-entrained back into the negative pressure airflow that is within the vacuum bypass hose 516 for flowing out of the vacuum hose 506*b* back to another system (e.g., abrasive media recycler). It should be understood that the shape and configuration of the hose 516, T-connector 521, dropdown conduit 523, and/or vacuum hose 506*b* may be different than shown. A control panel 525 as shown in FIG. 5A may be used to set up and/or control operation of the conditioner 500. In addition to the control panel 525 being configured with a user interface (e.g., push-buttons, screen, etc.), the control panel 525 may be in communication with a local weather station on- or off-board the conditioner 500. The shape and position of the control panel 525 may be different than shown. FIGS. 5C-5H showing different views of the conditioner 500*c*-500*h*, and the ornamental appearance is shown. The configuration shown is illustrative, and various features may not be included or may have alternative embodiments (e.g., circles may be squares or rectangles, share edges and corners may be rounded, etc.).

The previous description is of at least one embodiment for implementing the invention, and the scope of the invention should not necessarily be limited by this description. The scope of the present invention is instead defined by the following claims.

What is claimed is:

1. A conditioner for processing abrasive media, comprising:

an inlet port through which the abrasive media and debris intermixed with the abrasive media is received by the conditioner;

a pre-classifier in fluid communication with the inlet port and configured to filter the abrasive media from the debris;

a conveyor in fluid communication with the pre-classifier and configured to move the pre-classified abrasive media from a first end to a second end of the conveyor;

a conveyor housing surrounding the conveyor, and configured to maintain the conveyor under a negative pressure;

at least one radiation source disposed within the conveyor housing and positioned above the conveyor so as to dry the pre-classified abrasive media while the conveyor is moving the pre-classified abrasive media, the at least one radiation source, conveyor, and the conveyor housing defining a dryer that dries the pre-classified abrasive media under the negative pressure; and an outlet port in fluid communication with the conveyor and configured to output the dry abrasive media from the conditioner.

2. The conditioner according to claim 1, wherein the pre-classifier is a trommel.

3. The conditioner according to claim 2, wherein the trommel defines openings having a common size, the openings of the trommel being at a lower density at a first, proximal end of the trommel relative to the inlet port and a higher density at a distal end of the trommel opposite the proximal end.

4. The conditioner according to claim 1, further comprising a chute in fluid communication with a distal end of the pre-classifier relative to the inlet port, the chute being configured to enable the debris that is filtered out by the pre-classifier to drop therethrough, the chute further including a vacuum sealed door at a bottom end of the chute to prevent the debris from dropping out until opened by an operator.

5. The conditioner according to claim 1, further comprising:

a pre-classifier housing surrounding the pre-classifier; and an intervening housing that surrounds an intervening pathway between the pre-classifier and the dryer, the conveyor housing and intervening housing including a vacuum-tight seal so as to maintain a negative pressure extending between the inlet port and the outlet port, thereby maintaining the abrasive media under negative pressure from the inlet port to the outlet port such that the abrasive media is under negative pressure while the abrasive media is on the conveyor beneath the at least one radiation source so as to reduce drying time relative to being under atmospheric pressure.

6. The conditioner according to claim 5, wherein the pre-classifier is positioned higher than the dryer such that pre-classified abrasive media is gravitationally fed from the pre-classifier into the dryer.

7. The conditioner according to claim 1, further comprising a vacuum bypass conduit in fluid communication with the pre-classifier and outlet port to conduct vacuum air flow without abrasive media and debris between the pre-classifier and the outlet port, whereby the dried abrasive media output from the conveyor is re-entrained from the second end of the conveyor back into the vacuum airflow of the vacuum bypass conduit to flow out of the outlet port.

8. The conditioner according to claim 7, further comprising a manifold in fluid communication with a housing portion surrounding the pre-classifier and the housing surrounding the conveyor, thereby enabling a portion of the vacuum airflow to flow into and through the housing surrounding the conveyor to the vacuum bypass conduit with the dried abrasive media, and wherein a remaining, higher vacuum airflow from the housing surrounding the pre-classifier flows into the vacuum bypass conduit.

9. The conditioner according to claim 1, further comprising a slot defined by a member with a bottom edge disposed above a surface on which the abrasive media enters the conveyor, a height of the slot defining a maximum level of pre-classified abrasive media that is supplied to the conveyor.

10. The conditioner according to claim 9, wherein the slot height is less than 0.15 inches.

11. The conditioner according to claim 9, wherein the slot is disposed in vertical alignment with the conveyor.

12. The conditioner according to claim 1, wherein the pre-classifier includes a vibratory tray configured to vibrate the abrasive media to cause the abrasive media to move from a first end to a second end of the vibratory tray.

13. The conditioner according to claim 12, wherein the vibratory tray is configured to move the abrasive media between 10 and 20 feet per minute.

14. The conditioner according to claim 13, wherein a length of the vibratory tray is between 6 feet and 10 feet long and between 3 feet and 6 feet wide.

15. The conditioner according to claim 14, further comprising a controller is (i) in electrical communication with the conveyor and the at least one radiation source, and (ii) configured to include multiple modes that respectively control the conveyor to move the pre-classified abrasive media at different speeds and/or control the at least one radiation source, wherein in a first mode, the controller controls the vibratory tray to move the abrasive media between 15 and 20 feet per minute with the at least one radiation source turned ON; and wherein in a second mode, the controller controls the vibratory tray to move the abrasive media between 15 and 20 feet per minute with the at least one radiation source turned OFF.

16. The conditioner according to claim 15, wherein in a third mode, the controller controls the vibratory tray to move the abrasive media less than 15 feet per minute with the at least one radiation source turned ON.

17. The conditioner according to claim 12, further comprising a plurality of airbags disposed between the vibratory tray and a floor beneath the vibratory tray, wherein the airbags provide support for the vibratory tray when filled with air during conveyor operations and enable the vibratory tray to rest on the floor when the airbags are deflated.

18. The conditioner according to claim 17, further comprising:

an air pump configured to pump air into the airbags and remove air from the airbags, and a controller configured to cause the air pump to pump air and remove air from the airbags.

19. The conditioner according to claim 1, wherein the at least one radiation source produces an infrared signal to heat moisture on the abrasive media.

20. The conditioner according to claim 1, further comprising:

a plurality of temperature sensors disposed within the housing and arranged to sense temperature of the abrasive media at different positions along the length of the conveyor between the first and second ends; and electronics, in electrical communication with the plurality of temperature sensors, and configured to selectively:

turn OFF at least one of the at least one radiation source closer to the second end of the conveyor relative to a position of a respective temperature sensor that sensed a temperature of the abrasive media to be higher than a predetermined temperature level indicative of the abrasive media being dry, and turn ON at least one of the at least one radiation source closer to the second end of the conveyor relative to a position of a respective temperature sensor that sensed the temperature of the abrasive media to be lower than the predetermined temperature level indicative of the abrasive media not being dry.

* * * * *